Feb. 16, 1971   R. C. CAMP   3,564,490
METHOD AND MEANS FOR MEASURING DEPTH OF WATER OR THE LIKE
Original Filed Jan. 25, 1968                           2 Sheets-Sheet 1
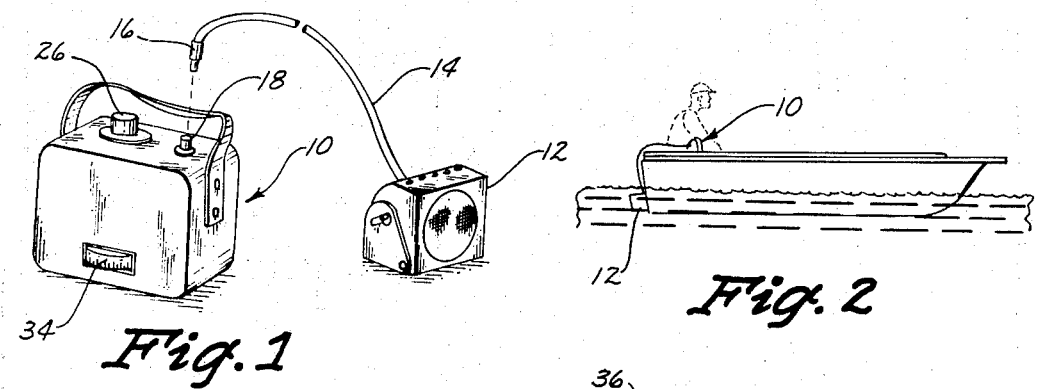
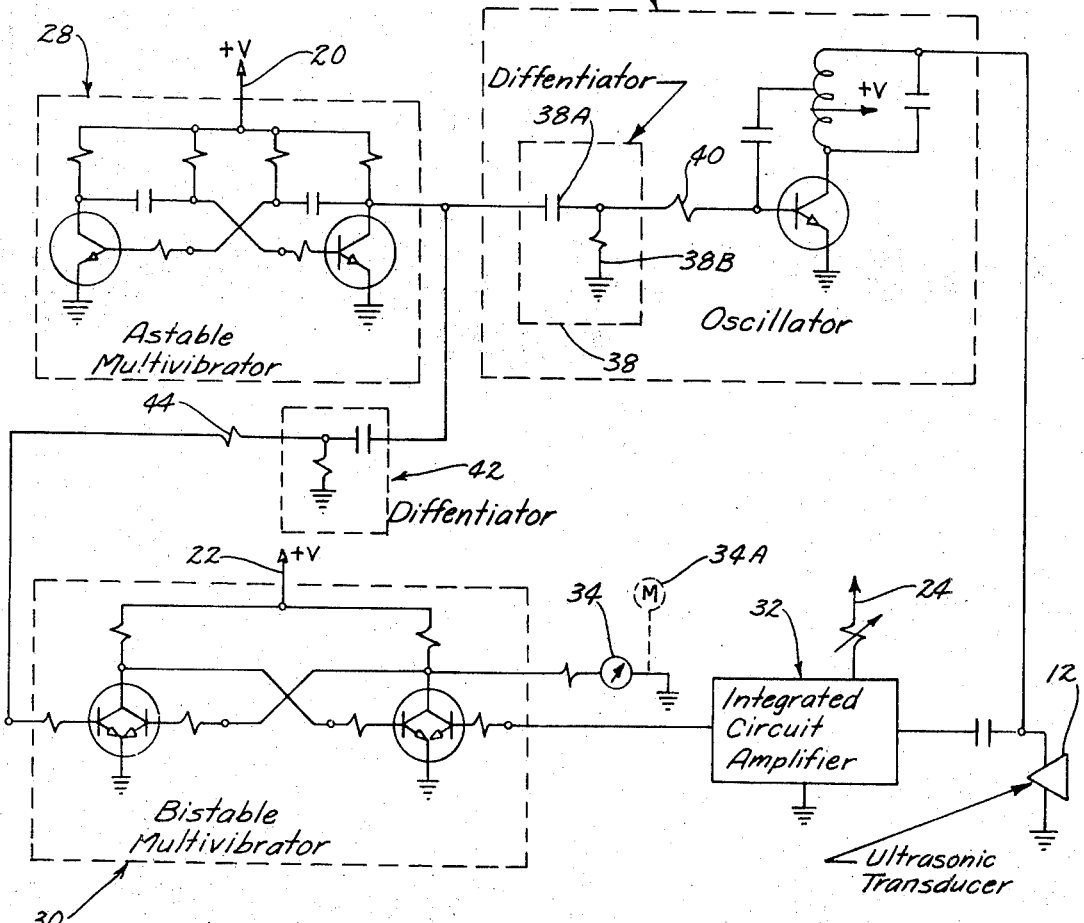
INVENTOR
ROGER C. CAMP
BY
Zarley, McKee & Thomte
ATTORNEYS

United States Patent Office 3,564,490
Patented Feb. 16, 1971

3,564,490
METHOD AND MEANS FOR MEASURING DEPTH OF WATER OR THE LIKE
Roger C. Camp, Ames, Iowa, assignor to Iowa State University Research Foundation, Ames, Iowa, a corporation of Iowa
Continuation of application Ser. No. 700,511, Jan. 25, 1968. This application Aug. 19, 1969, Ser. No. 854,020
Int. Cl. G01s 9/68
U.S. Cl. 340—3                                    4 Claims

ABSTRACT OF THE DISCLOSURE

An electronic depth gauge wherein a low frequency pulse generator is connected to an ultrasonic transducer through an oscillator to emit a signal downward through a body of water or the like, with the reflected signal being received by the transducer and converted to a reflected voltage input. An amplifier is connected to the transducer to amplify the reflected voltage, which in turn is connected to a switching mechanism. The switching mechanism is connected to the low frequency pulse generator and a meter of the D'Arsonval type, which is graduated in feet and which measures average current values proportional to the time that the unit measures maximum depth with respect to the time that the switching mechanism is interrupted by the amplified voltage of the signal reflected from the bottom of the body of water.

---

This is a continuation of application Ser. No. 700,511, filed Jan. 25, 1968.

Electrical depth finders have been designed for use in sport fishing and light boating, but these devices have several common drawbacks. The power requirement for these units is substantially high, thus making impractical the continued use thereof on available batteries. These devices are extremely cumbersome and expensive to manufacture, and the indicators thereof are difficult to read under certain conditions and cannot be easily located at a plurality of points on the boat remote from the operational equipment.

Therefore, a principal object of this invention is to provide a method and means for measuring depth of water or the like which is reliable in performance, and which can be economically manufactured and housed in a small convenient package.

A further object of this invention is to provide a method and means for measuring depth of water or the like which has a very low power requirement to permit long and continued use with little battery drain.

A still further object of this invention is to provide a method and means for measuring depth of water or the like which is capable of continuously reflecting depth values from one or a plurality of meters.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings in which:

FIG. 1 is a perspective view of the device of this invention;

FIG. 2 is a perspective view of a boat upon which the device of this invention is being used;

FIG. 3 is a schematic drawing of the components of the device of this invention.

Figure 4:
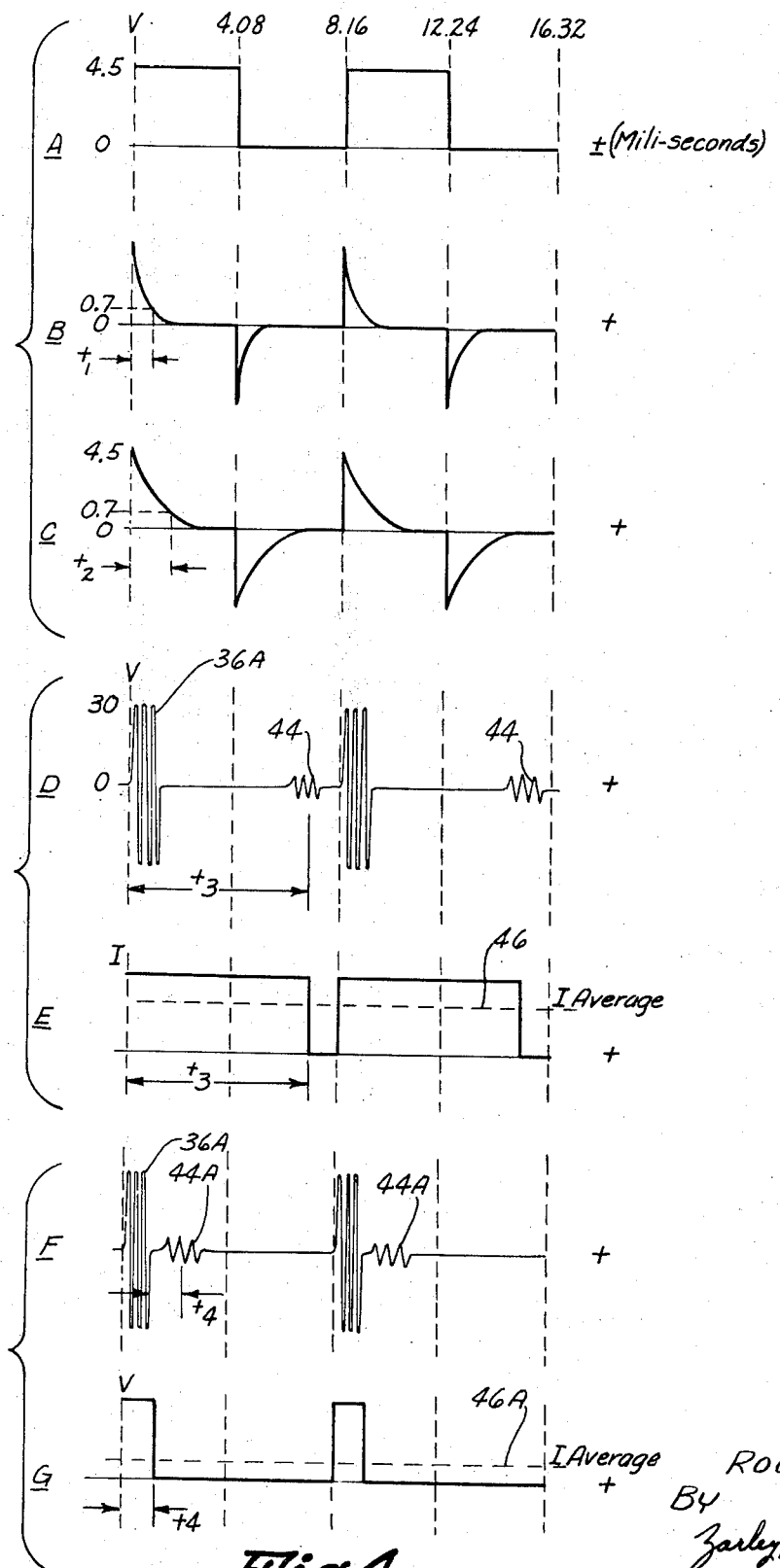
FIG. 4 is a plurality of graphs showing different operational characteristics of the device of this invention.

The numeral 10 generally designates the housing in which all of the components of FIG. 3 are packaged, except for the ultrasonic transducer head 12 which is remotely connected to housing 10 by lead 14. Coupling element 16 on lead 14 is adapted for electrical connection to socket 18 on housing 10.

Transducer head 12 is normally mounted in the water on the transom of a boat as shown in FIG. 2. With a fiberglass boat, which has about the same impedance as water, the head 12 could be mounted on the inside bottom of the boat in water and beamed in a downwardly direction. The head 12 is commercially available through the Marine Radio Equipment Co. of Chicago, Ill., and the precise design thereof is not a part of the instant invention. This head 12 utilizes barium titanate crystals which are capable of emitting an ultrasonic signal when a given voltage is imposed thereon. Conversely, this head has the additional characteristic of emitting a voltage upon the receipt of a reflected signal. Head 12 preferably should be capable of 200 kc. operation with an 8° beam width at 3 db down, although other types of heads would work equally well.

A battery (not shown) of conventional design is connected by conventional means (leads 20, 22 and 24) through switch 26 (FIG. 1) to the astable multivibrator 28, the bistable multivibrator 30, and the amplifier 32, respectively (FIG. 3). The multivibrators 28 and 30 are adaptations of digital computer integrated circuits, and the component 30 is known in the art as a "reset-set flip-flop." The specific function of these components in the environment of this invention will be discussed hereafter.

Graphs A, B and C in FIG. 4 show comparative voltage characteristics at different points in the circuitry of this invention, with voltage being plotted on a vertical axis and time being plotted on a horizontal axis. For purposes of understanding the graphs, it should be understood that the output of multivibrator 28 should create a maximum deflection in meter 34 which may be of the D'Arsonval type. Thus, if the unit is designed to measure water at maximum depths in the order of 20 feet, the meter 34 will be graduated to reflect maximum depth on the output current of the multivibrator 28. Since the depth of the water measured is a function of time that it takes the emitted signal to reflect itself to transducer head 12, it is the function of meter 34 to average the proportionate time of a full cycle that the set input into multivibrator 30 influences meter 34 before the voltage input from the reflected signal resets the multivibrator 30 to nullify the set input. Graphs A, B and C of FIG. 4 reflect an applied voltage of 4.5 volts and a cycle period of 8.16 milliseconds. The preferred cycle period should be between 4 and 100 milliseconds, and the frequency is in the order of 10 to 250 cycles per second. For purposes of discussion, the output of multivibrator 28 will cause maximum deflection of meter 34, and the maximum deflection of the meter will be assumed to reflect a depth of 20 feet.

Graph A in FIG. 4 indicates that multivibrator 28 will provide an output voltage of 4.5 volts for 4.08 milliseconds, and then drop to a zero value for the last half of the cycle. This input into oscillator 36 is transformed by differentiator 38 and current limiting resistor 40 into the wave form shown in Graph B. If the oscillator is adapted to function on an input of 0.7 volt, for example, it is seen from Graph B that the voltage output from differentiator 38 (comprised of capacitor 38A and resistor 38B) and resistor 40 will provide in excess of 0.7 volt for a period of only $T_1$, which normally would be in the order of 100 microseconds. The oscillator 36 will thereupon "fire" for only this period, and the 200 kc.

output sine wave resulting therefrom is designated by the numeral 36A in Graphs D and F.

The output of the astable multivibrator 28 is also altered before it is introduced into the bistable multivibrator 30. This change in output is reflected in Graph C (FIG. 4) and is influenced by differentiator 42 and current limiting resistor 44. It is important that the input voltage into multivibrator 30 be continued until after the oscillator 36 has dropped below its firing voltage of 0.7 volt so that a maximum deflection can be reflected on meter 34 until this value is altered or influenced by the signal reflected from the bottom of the body of water. Accordingly, as reflected in Graph C, the input or "set" voltage into multivibrator 30 is maintained above a value of 0.7 volt for a period of $T_2$ which is in the order of 200 microseconds, this being twice the value of $T_1$ on Graph B which illustrates the 100 microsecond interval that oscillator 36 is operational.

An inherent characteristic of the reset-set flip-flop components in the art (bistable multivibrator 30) is that the set input voltage will control the output voltage until the reset input voltage "resets" the device to cause the output to have a zero value. The "set" input for multivibrator 30 is that shown on Graph C (FIG. 4) as influenced by differentiator 42 and resistor 44. The "reset" voltage is the input received by the reflected signal, which will be discussed hereafter, and the output is the current supplied to the meter. The "set" voltage will remain reflected in the output current until the device is reset even though the set input voltage may have been withdrawn before the device is reset.

The impedance of the oscillator 36 is balanced at resonance with that of the transducer head 12 (such as at values of 10,000 ohms and 1,000 ohms, respectively) so that the maximum efficiency of the oscillator is achieved and minimum power drain on the battery is experienced. This result is accomplished by the careful selection of coils and other hardware within the oscillator.

The output voltage of the oscillator is converted to a beamed 200 kc. audio signal by transducer head 12, and this signal is normally directed vertically downwardly to the floor beneath the body of water. The signal reflected from the bottom is converted to a small input voltage by the transducer head through its conventional function. A signal reflected from approximately 20 feet would create "reflected" voltage in the order of 75 millivolts, and a signal reflected from 1 foot or less would create "reflected" voltage in the order of 1 volt. In any event, the "reflected" voltage is amplified by amplifier 32 to a level of at least 0.1 volt peak to peak to provide a reset input voltage into multivibrator 30. This triggers the multivibrator 30 in the conventional manner of reset-set flip-flops to cause the output voltage (or current) to the meter to be zero. The input set voltage (Graph C) is also zero at this point. The meter 34 thereupon senses this drop in current, and seeks to move from its position of maximum deflection.

Graph D shows the sine wave of the voltage of a reflected signal received by the multivibrator 30 at 7.2 milliseconds ($T_3$) into the cycle of 8.16 milliseconds. The solid lines in Graph E show that meter 34 theoretically showed maximum deflection (20 feet in depth) for 7.2 milliseconds and zero deflection for the remaining 0.96 millisecond of the cycle. However, the inability of the meter to instantaneously move from maximum deflection to zero deflection as the cycles are repeated results in the meter reflecting an average deflection which is directly proportional to the period of time the meter stayed at full deflection in a given cycle before it was interrupted by the reflected voltage of the reflected signal. The dotted line 46 in Graph E reflects the average meter reading under these circumstances. Thus, if Maximum deflection=20 feet;
Cycle period=8.16 seconds Portion of cycle expired before multivibrator 30 is reset by reflected voltage=7.2 seconds;

then

Average deflection $$= \text{Maximum deflection} \frac{\text{(Cycle period)}}{\text{(Portion of cycle belore reset by reflected voltage)}} = 20 \frac{(7.2)}{(8.16)}$$

=approximately 18 feet

Similarly, Graph F shows a reflected voltage 44A which resets multivibrator 30 at 0.8 millisecond ($T_4$) into the cycle which left the voltage (or current) at the meter at a zero level during the remaining 7.36 milliseconds of the cycle. Thus, from above, the meter would reflect an $$\text{Average deflection} = 20 \frac{(0.8)}{(8.16)} = \text{approximately 2 feet}$$

The dotted line 46A in Graph G reflects this average reading of the meter.

Ordinarily, the fisherman will know generally the depth of water that he is in, and if the meter suddenly moves from a continuous reading of approximately 20 feet to a reading of 2 feet or so, the meter will merely be indicating a reading of approximately 22 feet. Thus, if the multivibrator 30 were interrupted only after 0.8 millisecond into the second cycle without being interrupted by a reflected signal during the preceding cycle, the average deflection would be computed as follows:

$$\text{Average deflection} = 20 \frac{(8.16 + 0.8)}{(8.16)}$$

=approximately 22 feet

The numeral 34A (FIG. 3) indicates an additional meter that could be connected in series with meter 34 so that the depth of the water could be read from more than one meter at points remote from the housing 10.

From the foregoing, it is seen that an accurate and economical method and means for measuring depth of water or the like is achieved through this invention, and that at least all of the stated objectives are accomplished.

Some changes may be made in the construction and arrangement of my method and means for measuring depth of water or the like without departing from the real spirit and purpose of my invention, and it is my intention to cover by my claims, any modified forms of structure or use of mechanical equivalents which may be reasonably included within their scope.

I claim:

1. In an electronic depth gauge, an electronic circuit, comprising, a pulse generator comprised of an astable multivibrator, an oscillator operatively connected to said pulse generator, a single transmitting and receiving element operatively connected to said oscillator for transmitting an ultrasonic signal, and for receiving reflected transmitted signals; the cycle period of said transmitted signal being approximately between 4 and 100 milliseconds, a switching mechanism comprised of a bistable multivibrator operatively secured to said pulse generator and said transmitting and receiving element, a source of electrical energy having an output voltage of approximately 4.5 volts connected to said pulse generator and said switching mechanism, a meter means operatively connected to said pulse generator through said switching mechanism whereby the output from said pulse generator will be indicated by said meter means, and means within said switching mechanism connected to said receiving element for releasing said meter means from the influence of said output when said receiving element receives a reflected transmitted signal, whereupon said meter upon being continuously subjected to operation by said output and released by said reflected signal will indicate an average value of output proportionate to the time in each cycle of output that said output remains uninterrupted by said reflected signal.

2. The device of claim 1 wherein said control means is an electrical differentiator.

3. The device of claim 1 wherein an amplifier is connected to said receiving means to amplify voltage created by said reflected transmitted signal.

4. The device of claim 1 wherein said transmitting and receiving means include barium titanate crystals which emit ultrasonic audio signals upon the application of a given voltage, and which develop voltage upon the receipt of a signal of given magnitude.

References Cited

UNITED STATES PATENTS

| 2,574,596 | 11/1951 | Slaymaker | 340—1 |
| 2,728,900 | 12/1955 | Ross | 340—3 |
| 3,061,812 | 10/1962 | Rachwalski | 340—3 |
| 3,351,895 | 11/1967 | Copp et al. | 340—3 |

OTHER REFERENCES

Mitchell: Electronics World, vol. 62, No. 2, August 1959, pp. 42, 43, 44, 108, 110.

RICHARD A. FARLEY, Primary Examiner